US012684337B2

(12) United States Patent
Mariyani et al.

(10) Patent No.: US 12,684,337 B2
(45) Date of Patent: Jul. 14, 2026

(54) THIRD-PARTY WIRELESS DEVICE IDENTIFICATION

(71) Applicant: T-Mobile Innovations LLC, Overland Park, KS (US)

(72) Inventors: Anil Kumar Mariyani, Ashburn, VA (US); Subramania Kaushik, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 342 days.

(21) Appl. No.: 18/476,548

(22) Filed: Sep. 28, 2023

(65) Prior Publication Data

US 2025/0113179 A1 Apr. 3, 2025

(51) Int. Cl.
*H04W 8/24* (2009.01)
(52) U.S. Cl.
CPC ..................................... *H04W 8/24* (2013.01)
(58) Field of Classification Search
CPC .. H04W 8/24; H04L 2101/38; H04L 61/4547; H04M 3/42068; H04M 3/4211
See application file for complete search history.

(56) References Cited

U.S. PATENT DOCUMENTS

| 2009/0006414 | A1* | 1/2009 | Imbimbo | H04W 12/80 |
| 2009/0064313 | A1* | 3/2009 | Zampiello | H04L 63/08 |
| | | | | 726/17 |
| 2011/0269430 | A1* | 11/2011 | Di Donato | H04L 63/306 |
| | | | | 455/412.2 |
| 2020/0213839 | A1* | 7/2020 | Truchan | H04L 9/0869 |
| 2021/0288813 | A1 | 9/2021 | Imbimbo et al. | |
| 2021/0385255 | A1* | 12/2021 | Imbimbo | H04L 63/306 |
| 2023/0269591 | A1 | 8/2023 | Vitiello et al. | |

* cited by examiner

*Primary Examiner* — Fayyaz Alam
(74) *Attorney, Agent, or Firm* — Jones Burke, PLLC

(57) ABSTRACT

Systems and methods are provided for notifying third-party servers, such as law enforcement agency servers, of updates to wireless user equipment identifiers. The method includes receiving a replacement wireless user equipment identifier to replace a current wireless UE identifier. It is determined that a third-party server (law enforcement agency) information request is associated with the current wireless UE identifier (such as an IMEI or PEI). Responsive to determining there is an information request from a third-party server associated with the current wireless UE identifier, notification of the replacement wireless user equipment identifier is generated and transmitted to the third-party server.

17 Claims, 5 Drawing Sheets

100

150

PEI 5432

120

180

160

PEI 1234

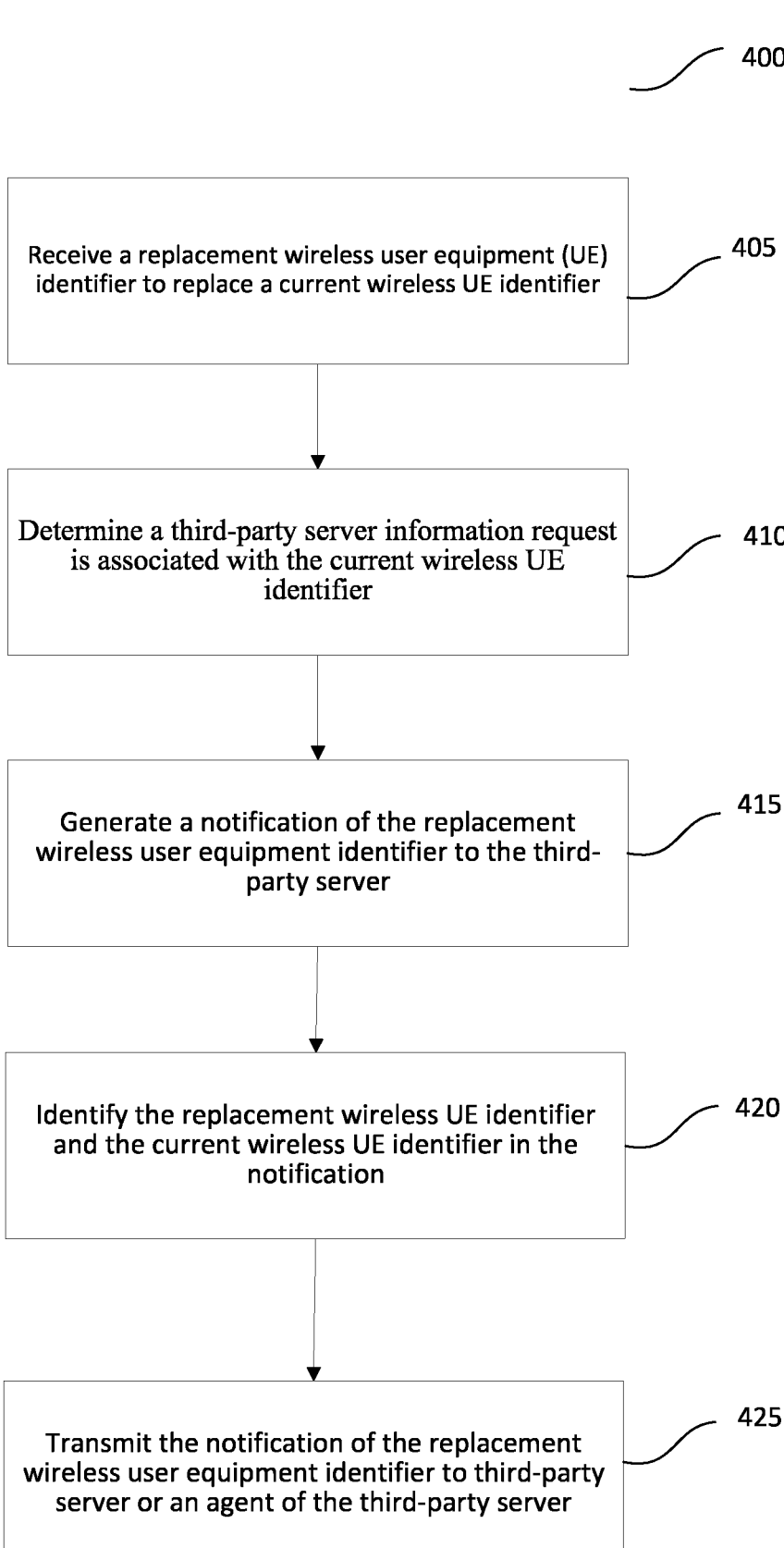

Receive a replacement wireless user equipment (UE) identifier to replace a current wireless UE identifier — 405

Determine a third-party server information request is associated with the current wireless UE identifier — 410

Generate a notification of the replacement wireless user equipment identifier to the third-party server — 415

Identify the replacement wireless UE identifier and the current wireless UE identifier in the notification — 420

Transmit the notification of the replacement wireless user equipment identifier to third-party server or an agent of the third-party server — 425

THIRD-PARTY WIRELESS DEVICE IDENTIFICATION

TECHNICAL BACKGROUND

A wireless network, such as a cellular network, can include an access node (e.g., wireless access node) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)).

Further, different types of access nodes may be implemented for deployment for the various RATs. For example, a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages.

As improvements are made on UE technology and 5G RATs to boost network capacity, consumers are upgrading their UE devices and adding new technology on a regular basis.

OVERVIEW

One aspect of the present disclosure relates to a system. The system may include one or more hardware processors configured by machine-readable instructions. The processor(s) may be configured to receive a replacement wireless user equipment identifier to replace a current wireless UE identifier. The processor(s) may be configured to determine a third-party server information request is associated with the current wireless UE identifier. The processor(s) may be configured to, responsive determining there is an information request from a third-party server associated with the current wireless UE identifier, generate a notification of the replacement wireless user equipment identifier to the third-party server.

In some implementations of the system, notification generated may identify the replacement wireless UE identifier and the current wireless UE identifier.

In some implementations of the system, the processor(s) may be configured to transmit the notification of the replacement wireless user equipment identifier to an agent of the third-party server.

In some implementations of the system, the processor(s) may be configured to transmit the notification of the replacement wireless user equipment identifier the third-party server.

In some implementations of the system, a lawful interception management system may transmit the notification of the replacement wireless user equipment identifier to an agent of the third-party server.

In some implementations of the system, the third-party server may be law enforcement agency (LEA). In some implementations of the system, the information request from the third-party server was made by the LEA.

Another aspect of the present disclosure relates to a method. The method may include receiving a replacement wireless user equipment identifier to replace a current wireless UE identifier. The method may include determining a third-party server information request is associated with the current wireless UE identifier. The method may include responsive determining there is an information request from a third-party server associated with the current wireless UE identifier, generating a notification of the replacement wireless user equipment identifier to the third-party server.

Yet another aspect of the present disclosure relates to a non-transient computer-readable storage medium having instructions embodied thereon, the instructions being executable by one or more processors to perform a method. The method may include receiving a replacement wireless user equipment identifier to replace a current wireless UE identifier. The method may include determining a third-party server information request is associated with the current wireless UE identifier. The method may include responsive determining there is an information request from a third-party server associated with the current wireless UE identifier, generating a notification of the replacement wireless user equipment identifier to the third-party server.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings:

FIG. 4 illustrates a method for notifying a third-party server of changes to a wireless UE identifier in accordance with disclosed examples.

DETAILED DESCRIPTION

Figure 1A:
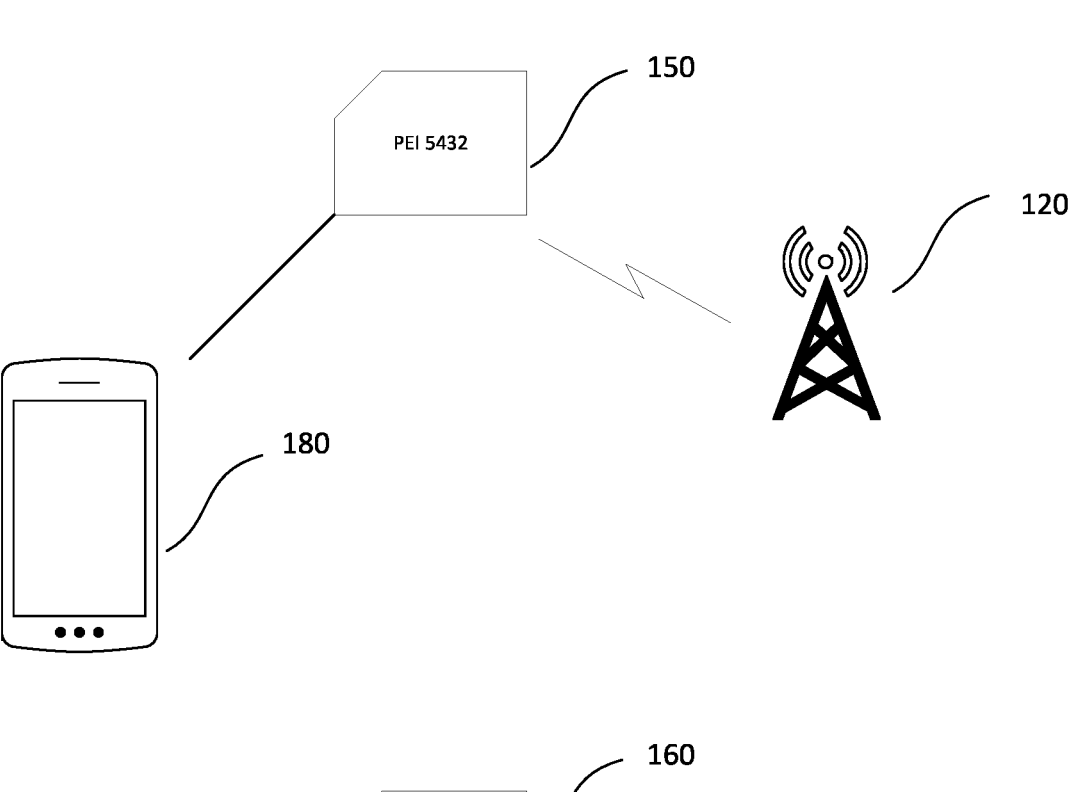
FIG. 1A depicts a wireless network that may be connected to a mobile device, in accordance with disclosed examples.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processor on the network for executing the instructions or methods. The processor may include an electronic processor.

Per 3GPP standards, a third-party, such as a law enforcement agency (LEA), may submit a lawful interception request for a mobile network operator (MNO) to collect and provide communication data for a target user device (subscriber device). Lawful interception allows LEAs to perform interception of communication traffic for a specific user(s). Lawful interception operates without being detected by the user of the target user device whose information is being intercepted and other unauthorized persons.

Upgrades to user equipment (UE) and SIM switches are common as UE and RAT technology continues to improve. However, current updates and changes to UE equipment are not currently tracked and reported to LEAs by lawful interception management systems (LIMS) used by MNOs.

A third-party notification engine enhances LIMS functionality. Based on 3GPP 33.107, 33.127 & 33.128 communications data for International Mobile Equipment Identification (IMEI) and/or permanent equipment identifier (PEI) associated with UEs can be intercepted. An LEA may make a lawful interception request to the LIMS server of an MNO. In examples, an LEA third-party or third-party agent may submit the request to target a specific IMEI and/or PEI. Communications data for the IMEI and/or PEI is provided to the LEA by an MNO utilizing LIMS. However, the LEA is not currently notified of any updates to equipment identifiers and subscriber information module (SIM) switches. As such, there is when a PEI-1/IMEI-1 gets updated and/or modified to PEI-2/IMEI-2, the LEA is not notified of any changes or updates resulting in a lawful interception monitoring gap.

Third-party notification engine, described herein, generate notifications in the form of S-records and notify LEAs of updates to equipment identifiers and SIM switch. Many UEs in use and on the market, including mobile devices and IoT devices, are equipped with 5G SIM. In examples, the provisioning system of the MNO facilitates monitoring and notification of updates to equipment identifiers and SIM switches target UEs. In an example, the provisioning systems of the MNO interface with the LIMS such that updates to equipment identifiers and SIM switches can be transmitted to requesting LEAs to be notified of changes in near real-time.

In an example, the provisioning system of the MNO sends S-records identifying update to equipment identifier and SIM switch using a first interface (e.g., X1 interface) to LIMS. LIMS forwards the updates to wireless UE identifiers and SIM switches to LEA servers or agent servers.

Figure 1B:
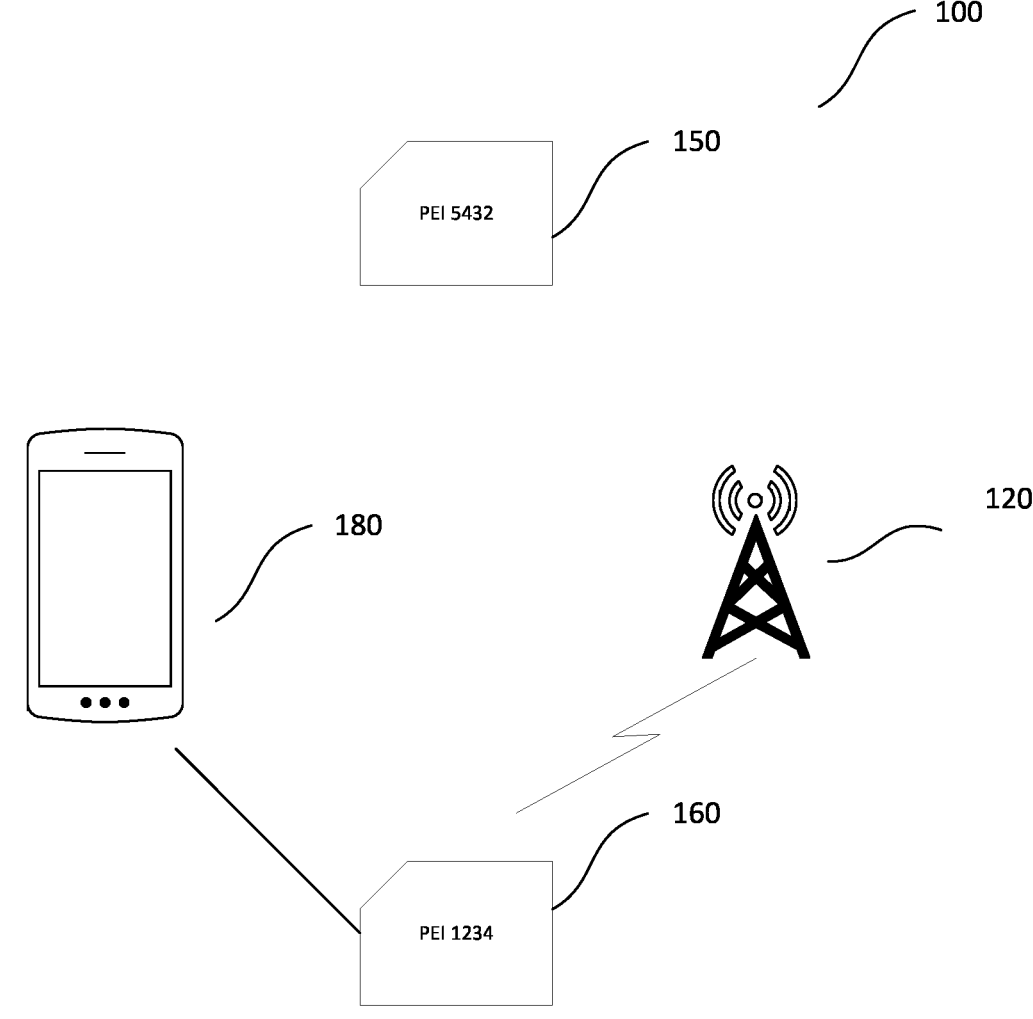
FIG. 1B depicts a wireless network that may be connected to a mobile device, in accordance with disclosed examples.

FIGS. 1A and 1B depict a wireless environment 100 illustrating an access node 120 and a UE 180. The UE 180 may be a cell phone, mobile phone, wireless phone, IoT device, as well as other types of devices or systems that are capable of radio frequency communication. UE 180 is capable of attaching to access node 120. Access node 120 may be operated by a Mobile Network Operator (MNO). While the wireless environment is depicted with a single UE 180 and single access node 120, it may comprise multiple UEs 180 and access nodes 120.

Access node 120 may be for a wireless network, such as a cellular network, and can include a core network and a radio access network (RAN) serving multiple UEs 180 in a geographical area covered by a radio frequency transmission provided by the access network. As technology has evolved, different carriers (MNOs) within the cellular network may utilize different types of radio access technologies (RATs). RATs can include fifth generation (5G) RATs (new radio (NR)) and 6G. Further, different types of access nodes may be implemented within the access network for deployment for the various RATs. A next generation NodeB (gNB) may be utilized for 5G RATs. Deployment of the evolving RATs in a network provides numerous benefits. For example, newer RATs, such as 5G RATs, may provide additional resources to subscribers, faster communications speeds, and other advantages.

With reference to FIG. 1A, UE 180 may be utilizing subscriber identity module (SIM) 150 for UE 180 to access the network. With reference to FIG. 1B, the subscriber for UE 180 may switch to SIM 160 to access the wireless network. SIM 150 and SIM 160 have different wireless UE identifiers (e.g., IMEI/PEI).

Figure 2:
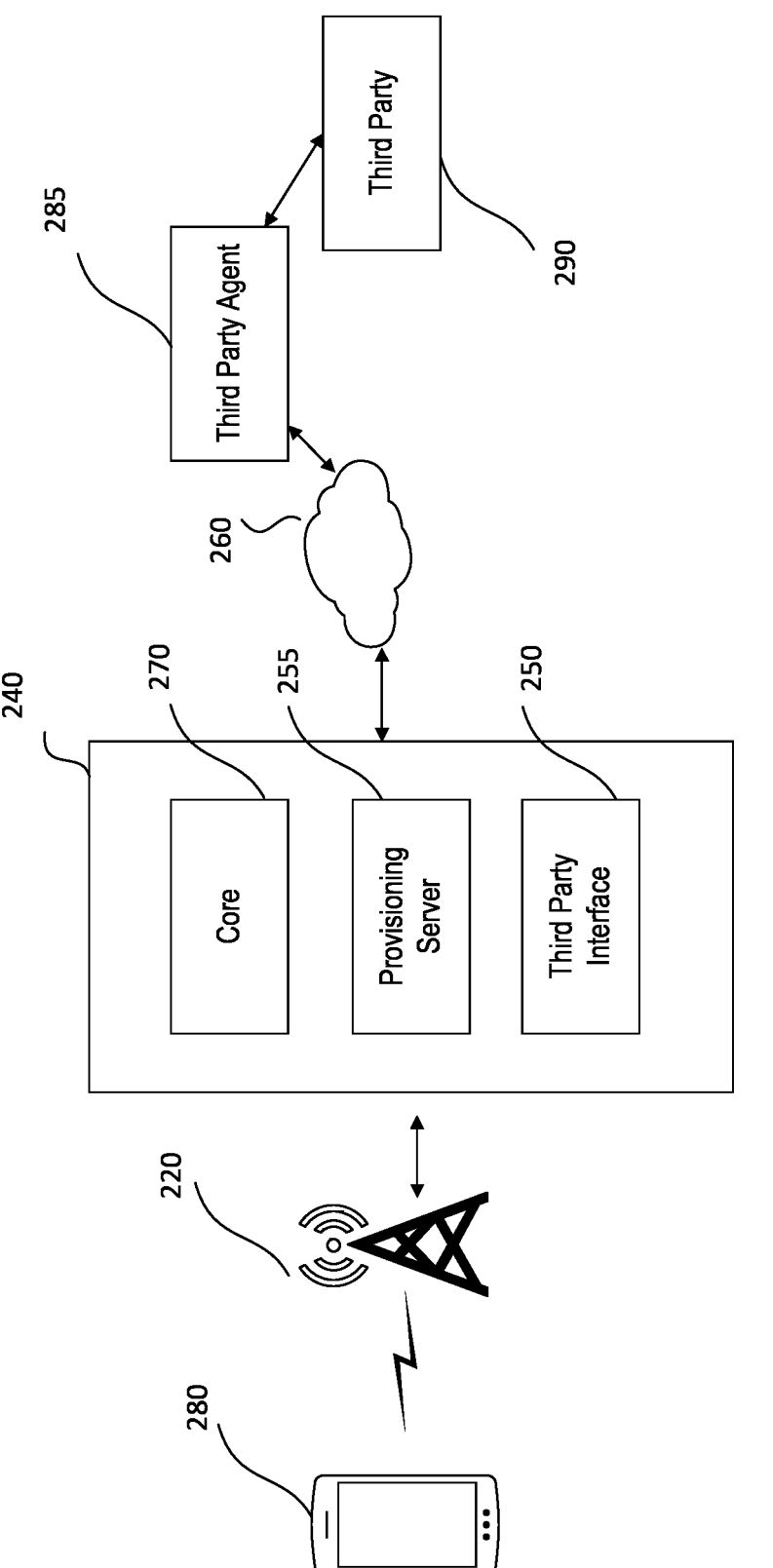
FIG. 2 depicts a wireless network connected to a third-party server in accordance with disclosed examples.

With reference to FIG. 2, a wireless environment 200 illustrating access node 220, UE 280, MNO 240, network 260, third-party agent 285, and third-party server 290. The UE 280 may be a cell phone, mobile phone, wireless phone, as well as other types of devices or systems that are capable of radio frequency communication. While depicted as a single UE 280, it will be appreciated that there may be multiple UEs.

Network 260 can be a wired and/or wireless communication network, and can comprise processing nodes, routers, gateways, and physical and/or wireless data links for carrying data among various network elements, including combinations thereof, and can include a local area network a wide area network, and the Internet.

MNO 240 may include a core 270, provisioning server 255 and third-party interface 250. Core 270 can be structured as an evolved packet core (EPC) network or as a 5G core using a service-based architecture (SBA) utilizing core network functions and elements, including, for example, user plane functions (UPF) control plane functions (CPF). The core 270 provides access to a communication network, such as the Internet or other packet data network.

The core 270 may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Provisioning server 255 is responsible for registering a UE identifiers, such as IMEI and/or PEI, and subscriber services to network elements, including various equipment connected in that network communication system.

Third-party interface 250 may be a Lawful Interception Management System (LIMS) LIMS can be used by MNO 240 to manage targeted lawful interception request and generation of IP data records (IPDRs) for telecommunications services.

Third-party agent 285 is able to interface with third-party interface of an MNO 240 as well as third-party server 290. Third-party agent 285 facilitates communications provisioning tasks, such communicating lawful intercept requests, using the same interface communications with third-party agent 285 and third-party server 290. In an example, the interface communication for lawful intercept requests is an X1 interface.

Third-party server 290 is a server separate from the MNO 240. In one example, the third-party server 290 is a LEA server. The third-party server 290 makes a lawful intercept request for a target UE 280, via third-party agent 285, to the third-party interface 250 of MNO 240. Third-party interface 250 communicates the lawful intercept request for a target UE to core 270 and provisioning server 255. Core 270 maintains the request in the subscriber profile for the target UE, for example in the UDM/UDR.

After receiving the lawful intercept request, the core 270 and provisioning server 255 are provisioned with tasks to intercept communications for the target UE 280. Core 270 and provisioning server 255 collect target-related "call" data from the network.

The intercepted communication from core 270 and provisioning server 255 to third-party interface 250. Third-party interface 250 formats the collected data to conform to specific standards and delivers the data and content to the law enforcement agency (LEA) via third-party agent 285 to third-party server 290. In one example, the collected data is delivered using X2 and X3 interfaces.

Figure 3:
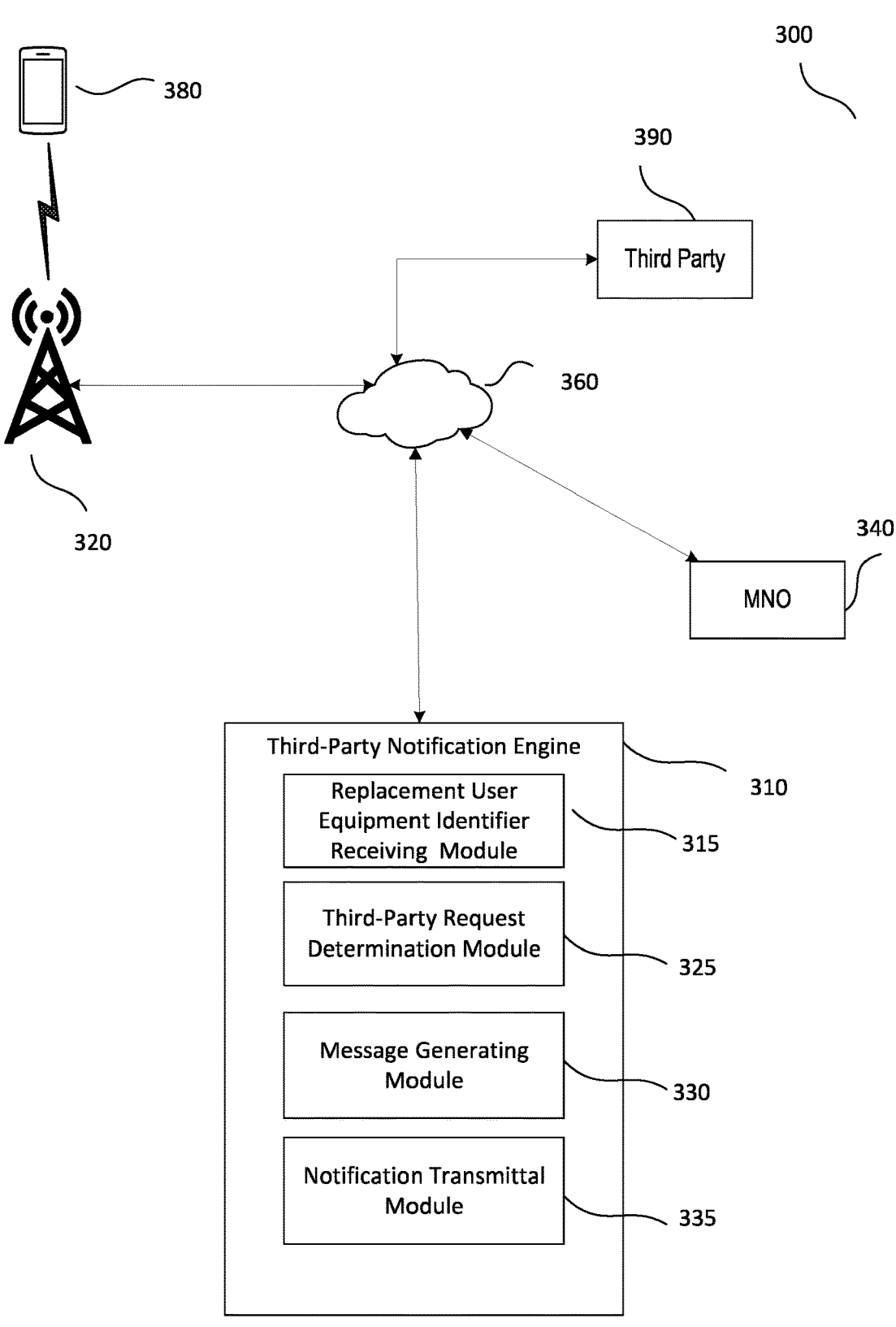
FIG. 3 illustrates a system and a third-party notification engine, in accordance with the disclosed examples.

FIG. 3 illustrates a system 300 configured to generate a notification of the replacement wireless user equipment (UE) identifier to the third-party server in accordance with one or more implementations.

As illustrated, system 300 comprises third-party notification engine 310, an access node 320, a network 360, which provide service in a coverage area, and a UE 380. For purposes of illustration and ease of explanation, only one access node 320, and UE 380 are shown in the system 300; however, as noted above with regard to FIG. 2, additional access nodes and/or additional local routers and mobile devices may be present in the system 300.

In the illustration of FIG. 3, the access node 320 is connected to the network 360 via an NR path (including a 5G core); however, in practical implementations the access node 320 may be connected to network 360 via multiple paths (e.g., using multiple RATs). The access node 320 may communicate with the MNO 340 via one or more communication links, each of which may be a direct link. However, it will be appreciated that network 360 may be any type of network facilitating communication.

The access node 320 may be any network node configured to provide communications between the connected wireless devices. As examples of a standard access node, the access node 320 may be a gNodeB in 5G networks, an eNodeB in 4G/LTE networks, or the like, including combinations thereof. Access node 320 and core may also provide data to third-party notification engine 310.

A third-party notification engine 310 is in communication with the MNO 340 and third-party server 390. The third-party notification engine 310 can comprise one or more electronic processors and associated circuitry to execute or direct the execution of computer-readable instructions such as those described herein. In so doing, the engine third-party notification engine 310 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the third-party notification engine 310 can receive instructions and other input at a user interface. In implementations, the operations of third-party notification engine 310 are performed by or under the control of a processor of a provisioning server and/or third-party interface of MNO 240 in a cloud environment.

As illustrated the third-party notification engine 310 utilizes a modular controller, a memory, wireless communication circuitry, and a bus through which the various elements of the third-party notification engine 310 may communicate with access node 320, MNO 340, and UE 380, third-party server 390. The modular controller is one example of an electronic processor, and may include sub-modules or units, each of which may be implemented via dedicated hardware (e.g., circuitry), software modules which are loaded from the memory and processed by the controller, firmware, and the like, or combinations thereof.

The instruction modules may include one or more of replacement user equipment identifier receiving module 315, third-party request determination module 325, information request determination module 330, notification transmittal module 335, and/or other instruction modules. Some or all of the sub-modules or units may physically reside within the controller or may instead reside within the memory and/or may be provided as separate units, in any combination. The various sub-modules or units may include or implement logic circuits, thereby performing operations.

While FIG. 3 illustrates the replacement user equipment identifier receiving module 315, third-party request determination module 325, information request determination module 330, notification transmittal module 335, as being separate modules, in practical implementations some of the modules may be combined with one another and/or may share components. The replacement user equipment identifier receiving module 315, third-party request determination module 325, information request determination module 330, notification transmittal module 335, may be configured to perform various operations to implement methods in accordance with the present disclosure. While one example of operations performed by the modules is described here, in practical implementations at least some of the operations described as being performed by one module may instead be performed by another module, including a module not explicitly named here.

Replacement user equipment identifier receiving module 315 may be configured to receive a replacement wireless user equipment identifier (e.g., IMEI or PEI) to replace a current wireless UE identifier (e.g., IMEI or PEI). The notification generated may identify the replacement wireless UE identifier and the current wireless UE identifier. The UE identifiers may be one of a permanent equipment identifier or an international mobile equipment identity and may be associated with a SIM.

Server information request determination module 325 may be configured to determine a third-party server information request (such as a lawful interception request for a target UE) is associated with the current wireless UE identifier. The third-party server information request for a target UE may be maintained in a provisioning server and/or subscriber database of MNO 340. In examples, a database lookup is performed for the current wireless user equipment identifier (target UE) to determine the information request from the third-party server is associated with the current wireless UE identifier (target UE).

Information request determination module 330 may be configured to, responsive determining there is an information request from a third-party server associated with the current wireless UE identifier, generate a notification of the replacement wireless user equipment identifier to the third-party server. In examples, a provisioning server of MNO 240 generates the notification. In an example, the notification is an X1 message.

A lawful interception management system of MNO 340 may transmit the notification of the replacement wireless user equipment identifier to an agent of the third-party server 390. The third-party server may be law enforcement agency. The information request from the third-party server was made by the LEA. The information request from the third-party server may be a lawful intercept request.

Notification transmittal module 335 may be configured to transmit the notification of the replacement wireless user equipment identifier and current to an agent of the third-party server or the third-party server. In examples, notification transmittal module 335 is a third-party interface of MNO 340, such as LIMS.

In some implementations, the replacement wireless UE identifier may be one of a permanent equipment identifier or an international mobile equipment identity. In some implementations, replacement wireless may UE identifier is associated with a subscriber identity module (SIM) switch.

FIG. 4 illustrates an exemplary process flow for notifying a third-party server of a change in a wireless UE identifier. The operations of FIG. 4 will be described as being performed by the third-party notification engine 310 for purposes of explanation. In other implementations, the operations may be performed by or under the control of a processor of a processing server, third-party interface, 5G core or processed in a cloud environment.

FIG. 4 illustrates a method 400 notifying a third-party server of a change in a wireless UE identifier in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 405, a replacement wireless user equipment identifier to replace a current wireless UE identifier is received.

At operation 410, it is determined if a third-party server information request is associated with the current wireless UE identifier.

At operation 415, when responsive determining there is an information request from a third-party server associated with the current wireless UE identifier, a notification of the replacement wireless user equipment identifier to the third-party server is generated. The message indicates that the replacement wireless user equipment identifier is replacing the current wireless UE identifier for which there is request from the third-party server (e.g., a lawful intercept request is in place for the current wireless UE identifier).

At operation 420, the replacement wireless UE identifier and the current wireless UE identifier are identified in the notification generated. At operation 425, notification of the replacement wireless user equipment identifier is transmitted to third-party server or an agent of the third-party server.

The operations of FIG. 4 need not necessarily be performed one after another in immediate sequence. While the above descriptions illustrate various aspects of the present disclosure, the present disclosure is not so limited. The methods and operations described above may be performed in an iterative matter. These additional iterations may also be reverted in a manner similar to that described above.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention and are intended to be illustrative and not restrictive. Many examples and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system, the system comprising:
one or more hardware processors configured by machine-readable instructions to:
    receive a replacement wireless user equipment (UE) identifier to replace a current wireless UE identifier;
    determine a third-party server information request is associated with the current wireless UE identifier;
    responsive to determining the third-party server information request is associated with the current wireless UE identifier, generate an X1 interface notification of the replacement wireless UE identifier to a third-party server; and
    transmit, via an X1 interface, the X1 interface notification of the replacement wireless UE identifier to the third-party server of the third-party server information request.

2. The system of claim 1, wherein the X1 interface notification generated identifies the replacement wireless UE identifier and the current wireless UE identifier.

3. The system of claim 1, wherein the one or more hardware processors are further configured by machine-readable instructions to:
    transmit the X1 interface notification of the replacement wireless UE identifier to an agent server of the third-party server.

4. The system of claim 1, wherein a lawful interception management system transmits the X1 interface notification of the replacement wireless user equipment identifier to an agent server of the third-party server.

5. The system of claim 1, wherein the third-party server is a server of a law enforcement agency (LEA).

6. The system of claim 5, wherein the third-party server information request from the third-party server was made by the server of the LEA.

7. A method, the method comprising:
receiving a replacement wireless user equipment (UE) identifier to replace a current wireless UE identifier;
determining a third-party server information request is associated with the current wireless UE identifier;
responsive to determining the third-party server information request associated with the current wireless UE identifier, generating an X1 interface notification of the replacement wireless user equipment identifier to a third-party server; and
transmitting, via an X1 interface, the X1 interface notification of the replacement wireless UE identifier to the third-party server of the third-party server information request.

8. The method of claim 7, wherein the X1 interface notification generated identifies the replacement wireless UE identifier and the current wireless UE identifier.

9. The method of claim 7, further comprising:
transmitting the X1 interface notification of the replacement wireless user equipment identifier to an agent server of the third-party server.

10. The method of claim 7, wherein a lawful interception management system transmits the X1 interface notification of the replacement wireless user equipment identifier to an agent server of the third-party server.

11. The method of claim 10, wherein the third-party server is a server of a law enforcement agency.

12. The method of claim 11, wherein the third-party server information request from the third-party server was made by the server of the LEA.

13. A non-transient computer-readable storage medium having instructions embodied thereon, the instructions being executable by one or more processors to perform a method, the method comprising:
receiving a replacement wireless user equipment identifier to replace a current wireless UE identifier;
determining a third-party server information request is associated with the current wireless UE identifier; and
responsive to determining the third-party server information request associated with the current wireless UE identifier, generating an X1 interface notification of the replacement wireless user equipment identifier to a third-party server; and
transmitting, via an X1 interface, the X1 interface notification of the replacement wireless UE identifier to the third-party server of the third-party server information request.

14. The non-transient computer-readable storage medium of claim 13, wherein the X1 interface notification generated identifies the replacement wireless UE identifier and the current wireless UE identifier.

15. The non-transient computer-readable storage medium of claim 13, wherein the method further comprises:
transmitting the X1 interface notification of the replacement wireless user equipment identifier to an agent server of the third-party server.

16. The non-transient computer-readable storage medium of claim 13, wherein a lawful interception management system transmits the X1 interface notification of the replacement wireless user equipment identifier to an agent server of the third-party server.

17. The non-transient computer-readable storage medium of claim 16, wherein the third-party server is a server of a law enforcement agency.

* * * * *